United States Patent [19]

Tusso et al.

[11] 4,236,808
[45] Dec. 2, 1980

[54] COPIER SCAN AND COLLATOR BACK BAR CONTROL

[75] Inventors: Robert J. Tusso, Old Saybrook; Peter Feher, East Hartford, both of Conn.; Max Schultes, Old Tappan, N.J.; Dietmar Eberlein, New City, N.Y.

[73] Assignee: Savin Corporation, Valhalla, N.Y.

[21] Appl. No.: 2,670

[22] Filed: Jan. 11, 1979

[51] Int. Cl.³ .............................................. G03G 15/28
[52] U.S. Cl. .......................................... 355/8; 271/224; 355/3 SH; 355/14 SH; 355/14 R
[58] Field of Search ................... 355/3 SH, 14 SH, 8, 355/14 R; 271/287, 224

[56] References Cited

U.S. PATENT DOCUMENTS

| | | | |
|---|---|---|---|
| 3,486,819 | 12/1969 | Giulio | 355/8 X |
| 3,560,087 | 2/1971 | Washio et al. | 355/8 |
| 3,592,464 | 7/1971 | Kanda | 271/223 |
| 3,640,615 | 2/1972 | Schaeffer | 355/8 |
| 3,697,165 | 10/1972 | Morriston et al. | 355/8 |
| 4,009,957 | 3/1977 | Suzuki et al. | 355/14 SH |
| 4,026,540 | 5/1977 | Lawrence | 271/287 |

Primary Examiner—R. L. Moses
Attorney, Agent, or Firm—Shenier & O'Connor

[57] ABSTRACT

A control system for a copying machine having a scanning optical system and main and auxiliary supplies of copy paper of different size and adapted for use with a collator having a back bar, in which a signal which is produced when the machine is turned on automatically sets the machine to feed paper from the main supply and sets the initial scan to the length of the longest copy and in which a signal which is a measure of the length of the first copy being made in a given operation sets the length of the scan and positions the collator back bar in accordance with the length of the first copy.

11 Claims, 6 Drawing Figures

COPIER SCAN AND COLLATOR BACK BAR CONTROL

BACKGROUND OF THE INVENTION

Our invention relates to the field of copiers and more particularly plain paper copiers which employ a scanning exposure system, which are capable of making copies on copy paper of two different sizes and which are adapted for use with a collator.

There are known in the prior art copying machines which can selectively make copies on copy paper of different sizes from different supplies. Many such machines employ a scanning optical system in which a mirror is moved across the machine below a transparent platen on which the original is placed face down. In such machines, the length of scan is the length of the longest copy being made, whether or not one is actually making a copy which is shorter than the longest copy.

In most installations where, for example, letter-size and legal-size copies are being made, one or the other of the two sizes will be used with greater frequency. In such instances, one of the two cassettes with which the machine is provided is a high capacity cassette which may hold as many as 1,000 sheets of copy paper, while the other or auxiliary cassette holds only 250 sheets. Means is provided for manually selecting which of the two cassettes will be used. It often occurs that the machine user leaves the selecting member, such for example as a lever in position to feed sheets from the auxiliary cassette, whereas the next user is much more likely to wish to make a copy of the size of the sheet carried by the main cassette.

Many machines of the prior art presently are used with collators, which automatically separate copies being made into sets. Like the machines with which they are used, the collators are adapted to receive copies of different sizes. One form of collator known in the prior art is provided with a "back bar", which is adapted to arrest copies being fed into the bins of the collator. This back bar is, moreover, manually adjustable to the size of the copy being made, so that the stacks of copy sets formed in the collator are neat and uniform.

SUMMARY OF THE INVENTION

One object of our invention is to provide a copy machine control system which automatically sets the optical scan to the length of the first of a series of copies being made.

Another object of our invention is to provide a copy machine control system which automatically sets the back bar of a collator used with the copier to the length of the first of a series of copies being made.

A still further object of our invention is to provide a copy machine control system which initially sets the machine to make copies from the main cassette of the copier.

Other and further objects of our invention will appear from the following description.

In general our invention contemplates the provision of a control system for a copying machine having a scanning optical system and main and auxiliary supplies of copy paper of different size and adapted for use with a collator having a back bar, in which a signal produced when the machine is turned on automatically sets the machine to feed paper from the main supply and in which a signal which is a measure of the length of the first copy being made in a given operation sets the length of the scan to the copy length and sets the collator back bar to a position corresponding to the copy length. We provide means for shifting to the auxiliary supply as desired.

DESCRIPTION OF THE DRAWINGS

In the accompanying drawings to which reference is made in the instant specification and in which like reference characters are used to indicate like parts in the various views.

DESCRIPTION OF THE PREFERRED EMBODIMENT

Figure 1:
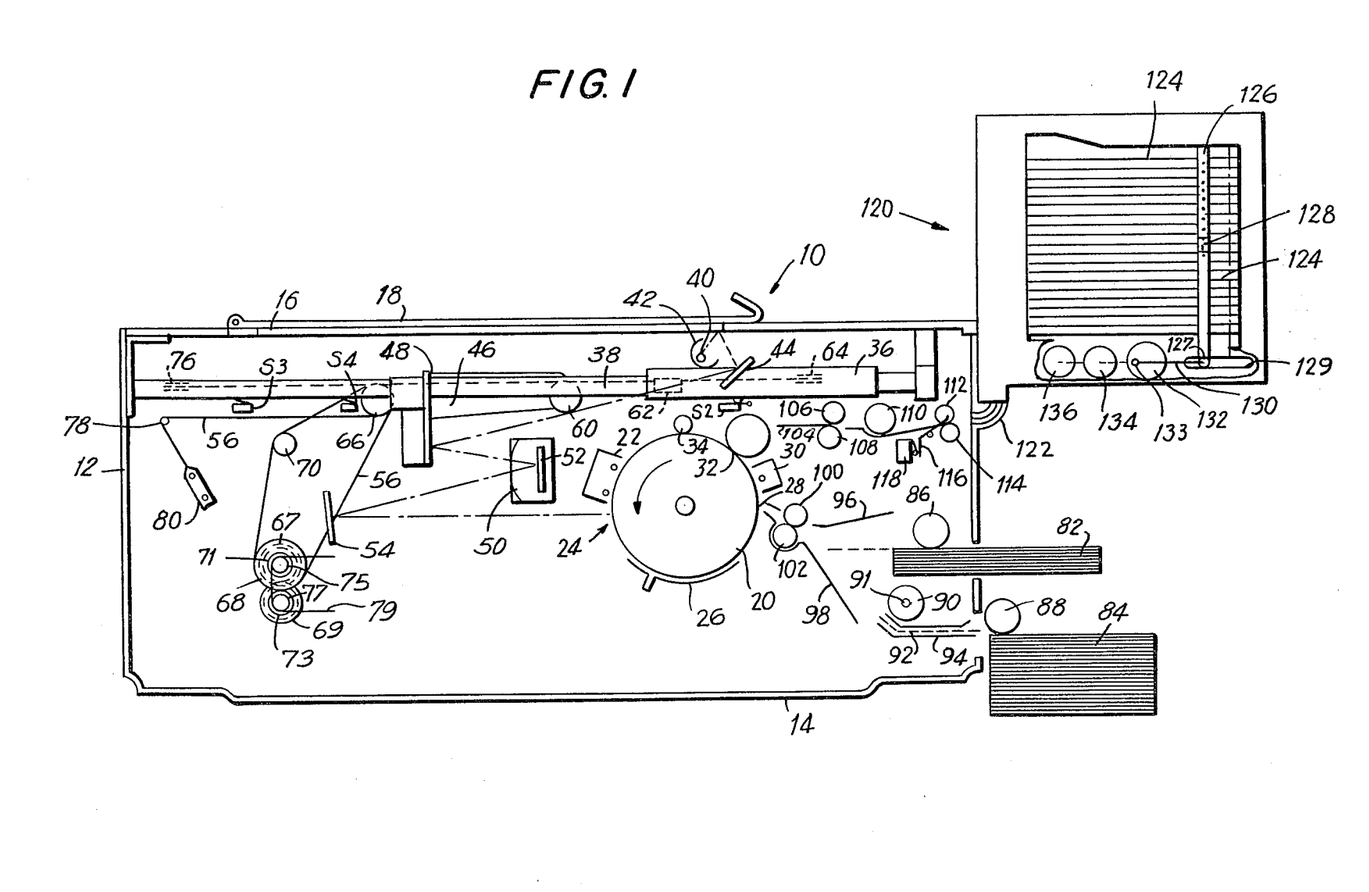
FIG. 1 is a schematic view of one type of apparatus with which our copier scan and collator back bar control system may be employed.
Figures 2, 3:
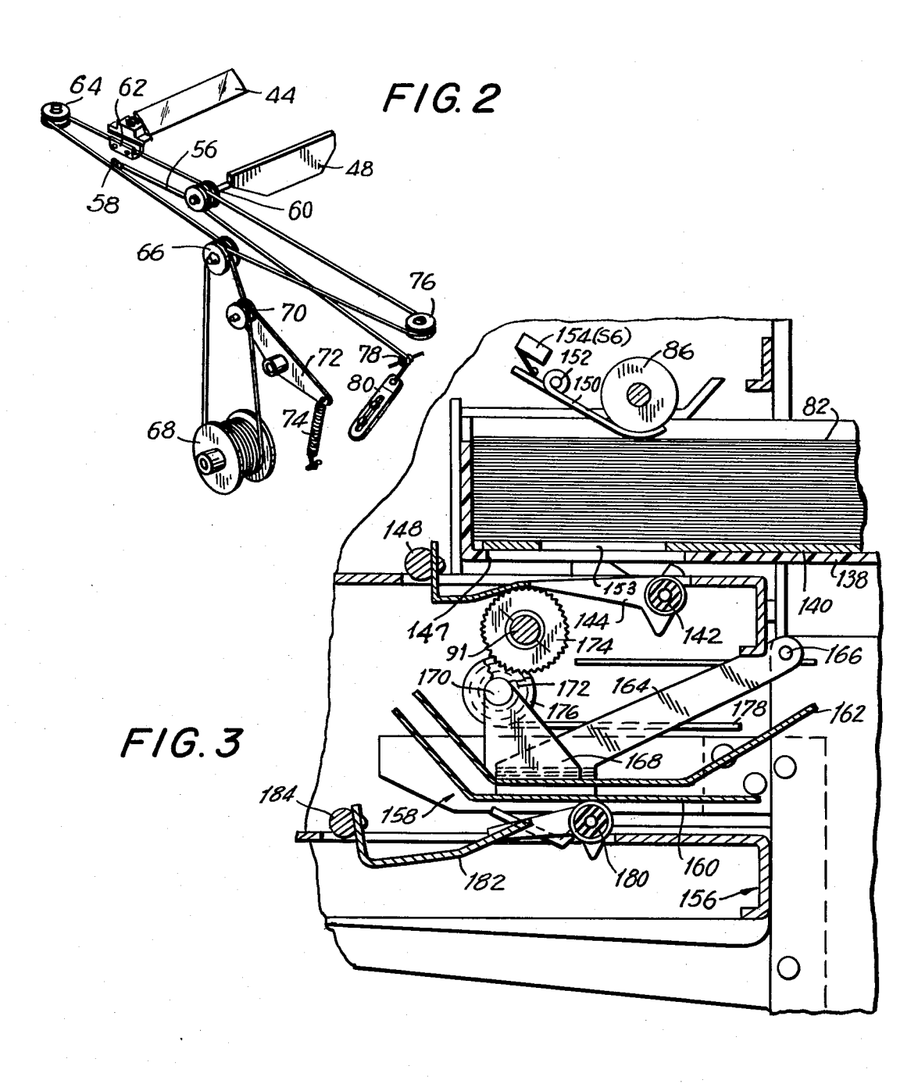
FIG. 2 is a perspective view of the scanner drive system of the apparatus illustrated in FIG. 1.
FIG. 3 is a fragmentary sectional view of a portion of the copy paper feeding apparatus of the machine with which our copier scan and collator back bar control system may be employed.

Referring now to FIGS. 1 and 2 of the drawings one type of copy machine indicated generally by the reference character 10 with which our copier scan and collator back bar control system may be employed, includes a cabinet 12 having a base 14. The top of the cabinet carries a transparent glass platen on which an original to be copied is placed face down. Platen 16 is adapted to be covered by a cover 18 after the original has been placed in position for copying.

The machine 10 includes a drum 20 having a photoconductive surface adapted to be moved successively past a charging corona 22, an exposure location 24, a developer applicator 26, a copy paper feed location 28, a transfer corona 30, a pick-off device 32 and a cleaning roll 34 in the course of a copying operation.

The optical system of the machine 10 includes a full rate carriage 36 supported by one or more guide rods 38 for movement across the cabinet 12 beneath the platen 16. Carriage 36 supports a lamp 40 and a reflector 42 adapted to focus a line of light on the document being copied through the transparent platen 16. Carriage 36 also supports a mirror 44 which reflects light received from the document to a mirror 48 mounted on a half rate carriage 46 supported on rods 38 for movement across the housing below the platen 16. Light received by the mirror 48 is reflected to pass through a lens 50 to a mirror 52 positioned behind the lens. Both the lens 50 and the mirror 52 are stationary. Mirror 52 directs light to a second stationary mirror 54 which reflects the light onto the surface of the drum 20 at the location 24.

The drive system for the carriages 36 and 46 includes a drive cable 56 which extends from a fitting 58 on the cabinet around a movable double pulley 60 mounted on the carriage 46 to a clamp 62 which secures the cable to the carriage 36. After leaving the clamp 62, the cable passes around a reversing pulley 64 to a fixed double pulley 66 from which the cable extends to and is wound around a drum 68. A tensioning pulley 70 carried by a lever 72 is urged into engagement with the cable 56 by the action of a spring 74 which urges the lever 72 to rotate in a clockwise direction as viewed in FIG. 2. After leaving the drum 58, the cable 56 again passes around the fixed double pulley 66 and around a second turning pulley 76 to the pulley 60. After passing around the pulley 60 the cable extends around the guide 78 to an adjustable fitting 80 secured to the cabinet 12.

In the course of a scanning operation, cable 56 is driven first to move mirror 44 from right to left below platen 16 as viewed in FIG. 1 at a certain rate. At the same time, the carriage 46 is driven at half the rate from right to left as viewed in FIG. 1, so that the length of the optical path from the document being copied to the surface of drum 20 remains constant in the course of the scanning operation. After the document has been scanned, the mirrors are returned to their original positions by reversing the cable drive. The above described cable drive is achieved by a system including a first gear 67 carried by the drum 68 for rotation therewith. Gear 67 meshes with a gear 69 mounted for rotary movement around an axis parallel to the axis of the drum 68. The driven members of respective magnetic clutches 71 and 73 are secured to the gears 67 and 69 for rotation therewith. The driver elements of clutches 71 and 73 are adapted to be driven by respective sprocket wheels 75 and 77 driven by the main drive chain 79 of the machine. It will readily be appreciated that with one of the clutches 71 energized, while the other clutch 73 is deenergized, cable 56 will be driven in one direction. Conversely, with energization of the other clutch and deenergization of the first, the cable will be driven in the reverse direction.

The particular machine 10 which we have illustrated in the drawings is adapted selectively to feed sheets of copy paper from an upper or auxiliary supply 82 or a lower or main supply 84. The respective supplies could, for example, be letter-size and legal-size or vice versa. An upper feed roll 86 is adapted to be driven in the course of operation of the machine to feed sheets one at a time from supply 82. A lower feed roll 88 is adapted to be driven to deliver sheets one by one from the supply 84 to a pair of spaced guides 92 and 94. The driving of the roller 88 is achieved by taking power from the shaft 91 of a lower inner feed roll 90. Sheets fed from the respective supplies are adapted to be positioned with their leading edges at the nip between a pair of registry rolls 100 and 102 which, as is known in the art, are driven when the leading edge of the developed image on drum 20 arrives a predetermined point, so that the image will be transferred to the copy sheet at the same location as the copied material appears on the original. Following transfer of the image to the copy sheet, the latter is picked off by the pick-off system 32 and is delivered to a guide 104 along which it passes to a pair of intermediate output feed rolls 106 and 108, which deliver the sheet to a heating roll 110 from whence the sheet passes to the outlet feed rolls 112 and 114. In the course of passing through the outlet rolls 112 and 114, the sheet strikes a feeler which causes a switch actuator 116 to actuate a microswitch 118.

The pick-off device which may be employed in the machine 10 is more fully described in the application of Schultes et al, Ser. No. 858,246, filed Dec. 7, 1977, for Improved Pick-Off Device for Electrostatic Copier. The system for feeding sheets respectively from the supplies 82 and 84 and, more particularly, the magazine for holding the relatively large supply 84 of copy sheets is more fully described in Landa Application Ser. No. 898,139, filed Apr. 20, 1978, for Large Capacity Combination Magazine and Sheet Feeder for Copying Machines.

In the arrangement illustrated in FIG. 1, the machine 10 is associated with a collator indicated generally by the reference character 120, to which copies from the feed rolls 112 and 116 are directed by a guide 122. Collator 120 includes a plurality of shelves or trays 124 and a mechanism (not shown) for feeding successive copies to successive trays 124 in the course of making one set of copies of a set of originals. Collator 120 includes a back bar 126 carrying a plurality of stops 128 extending across the spaces between adjacent shelves and against which the leading edges of copies fed to a shelf are to abut. Where the copy machine 10 is so set up as to make copies of two different sizes, back bar 126 is adapted selectively to be positioned at a first location illustrated in full lines in FIG. 1, intermediate the ends the shelves 124 and corresponding to the shorter length of copy being made by the machine 10. Alternatively, where longer copies are being made, the back bar 126 may be moved to a position shown in dot-dash lines in FIG. 1.

The back bar 126 may be mounted in any suitable manner for movement between its two positions. For example, rollers or the like 127 at the ends of the guide bar could be received in slots 129 in the collator frame. A link 130 connects one end of the back bar 126 to an eccentric pin 133 carried by a plate 132 adapted to be driven by a two-to-one speed reduction mechanism 134 which is driven by a motor 136. As will more fully be explained hereinbelow, with the back bar 126 in one of its two positions, motor 136 is driven through a single revolution to move it to its other position. When the position of the back bar is again to be changed, motor 136 is driven through a single revolution in the same direction to move the bar to its other position.

Referring now to FIG. 3, the upper cassette 138 of the machine 10 includes a support plate 140. A pressure roll 142 carried by arm 144 on a shaft 146 is adapted to be moved through an opening 147 in the cassette base in response to a counterclockwise movement of shaft 148 to bring the roll into engagement with the plate 140 to urge the supply 82 into engagement with roll 86 when it is desired to feed sheets from the supply 82. A feeler 150 pivotally carried by a pin 152 or the like normally rests on the uppermost sheet in the stack. When the last sheet in the stack has been removed, feeler 150 drops through an opening 153 in the plate 140 to actuate an empty switch 154 indicated that the supply of paper in the upper cassette 138 is exhausted.

The lower cassette indicated generally by the reference character 156 is supported on the machine 10 in a manner more fully described in the co-pending Landa application referred to hereinabove. This cassette includes a paper guide assembly indicated generally by the reference character 158 made up of a pair of guides 160 and 162 pivotally supported on the cassette by means of arms 164 carried by pivot pins 166. A bracket 168 carried by the guide 162 rotatably supports a shaft 170 carrying a gear 172 having teeth of generally rectangular configuration which are adapted to mesh with similar teeth carried by a split gear 174 secured to shaft 91 for rotation therewith. Shaft 170 also supports for rotation therewith a pulley 176 carrying a belt 178 which provides the drive for the roll 88 in a manner more fully pointed out in the Landa application referred to hereinabove.

The machine 10 includes a lower press roll 180 carried by an arm 182 mounted on a shaft 184. When it is desired to feed sheets from the lower or main cassette, roller 180 is resiliently urged into engagement with the guide 160 to move the guide assembly to a position at which gear 172 meshes with gear 174. In the arrangement of FIG. 3, the rolls 142 and 148 are in the position which they occupy when sheets are to be fed from the lower or main cassette. It is to be understood that a similar empty sensing arrangement to that associated with the upper cassette is provided for the lower cassette. That is to say, the stack supporting plate (not shown) of the lower cassette could be provided with an opening similar to opening 153 for the reception of a feeler similar to feeler 150 when the supply of sheets in the lower cassette was exhausted.

Figure 4:
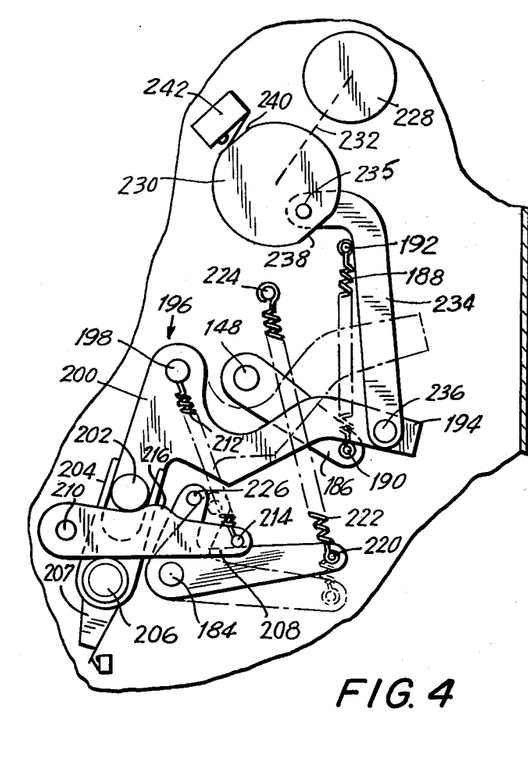
FIG. 4 is a fragmentary elevation of the mechanism for changing copy paper size in the apparatus illustrated in FIG. 1.

Referring now to FIG. 4, we have illustrated one form of mechanism for selectively rendering the main or lower cassette and the auxiliary or upper cassette active. Shaft 148 carries for rotation therewith a crank 186 normally urged to move in a counterclockwise direction as viewed in the figure by a spring 188 extending between a pin 190 on the end of the crank and a pin 192 carried by the machine frame. In the relative position of the parts shown, crank 186 is prevented from moving in a counterclockwise direction by virtue of the engagement of pin 190 with an arm 194 of the actuating bell crank indicated generally by the reference character 196, which is supported for rotary movement on a pivot pin 198. Another arm 200 of the bell crank 196 carries a roller 202 which is received in the upper bifurcated end of a guide arm 204 supported on a pivot pin 206. We mount a toggle arm 208 on a pivot 210. A spring 212 connected between a pin 214 on arm 208 and the pivot pin 198 normally urges the toggle arm 208 to move in a counterclockwise direction as viewed in FIG. 4. A boss 216 on the toggle arm 208 holds the parts in the position shown. An arm 207 on shaft 206 actuates a switch S13 to indicate which cassette is active.

Shaft 184 carries for rotation therewith a bell crank 218, one arm of which has a pin 220 which receives one end of a spring 222, the other end of which is secured to a pin 224 on the machine frame to urge the bell crank in a counterclockwise direction as viewed in FIG. 4. The other arm of bell crank 218 carries a pin 226 which is adapted to be engaged by an edge of the arm 200 to render the lower pressure roll 180 inoperative when it is desired to feed from the upper cassette.

A motor 228 has a shaft 232 carrying a plate 230 for rotation therewith. A link 234 connects an eccentric pin 235 on plate 230 to a pin 236 on arm 194. In the relative position of the parts as shown in FIG. 4, sheets are being fed from the main cassette while the upper cassette is inactive. If, however, shaft 232 rotates through half a revolution to move pin 235 through 180°, arm 194 moves to the dot-dash position shown in FIG. 4, while bell crank 218 moves to a dot-dash position. In this relative position of the parts, the auxiliary cassette 138 is active, while the main cassette is inactive. We provide the plate 230 with diametrically oppositely located flats 238 and 240. The outer periphery of the plate 230 is adapted to be engaged by the operating element of the microswitch 242. As will more fully be explained hereinbelow, switch 242 serves as a half revolution control for motor 228 ensuring that the motor will go through half a revolution after each energization thereof.

Figure 5:
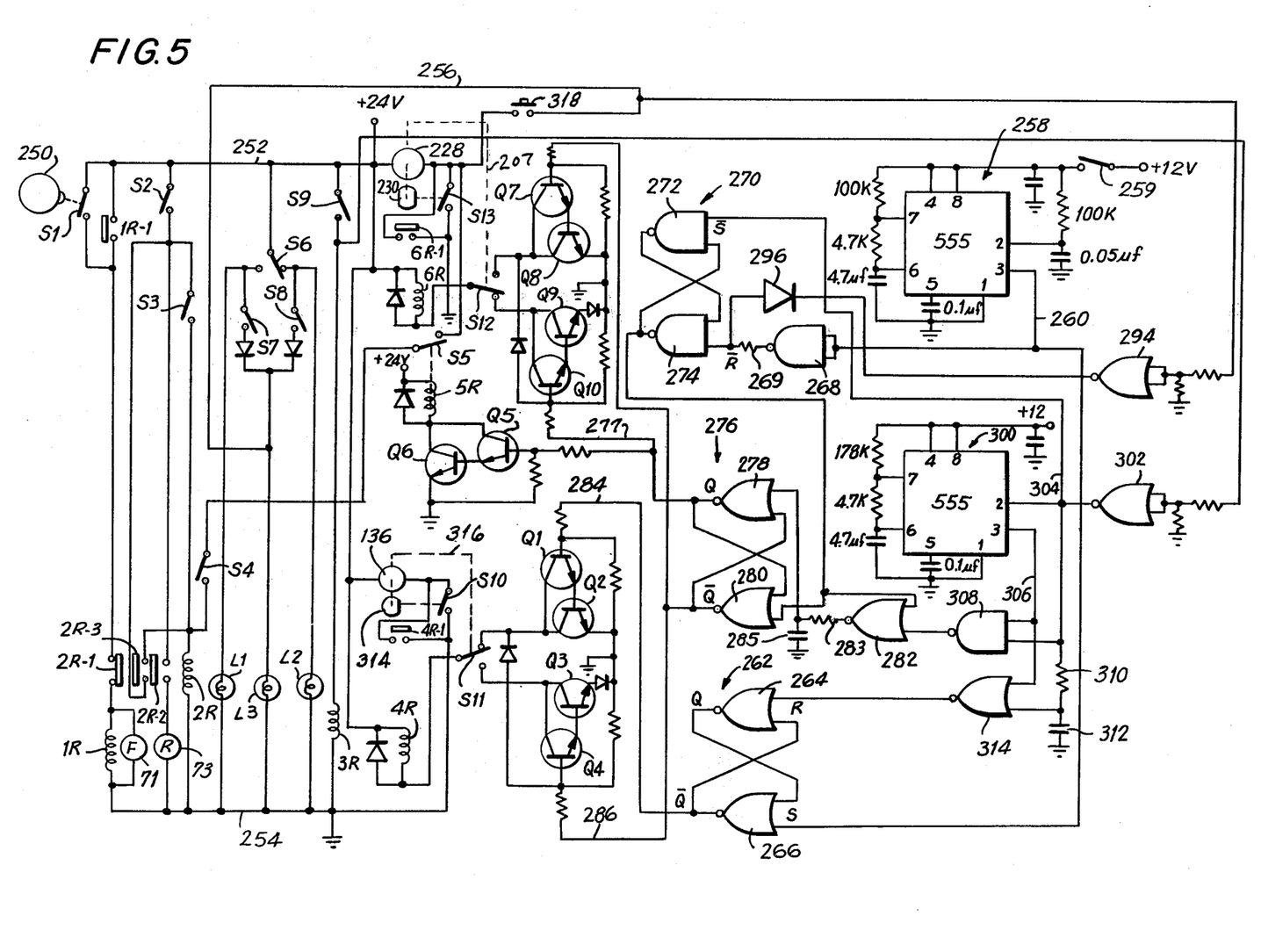
FIG. 5 is a schematic diagram of one form of electrical circuit which we may employ in our copy scan and collator back bar control system.

Referring now to FIG. 5 of the drawings, one form of electrical circuit which may be used to control the operation of the machine 10, includes a cam 250 driven in synchronism with the drum 20 to close a start cam switch S1 at the proper time in the course of operation of the machine to energize a relay winding 1R through normally closed contacts 2R-1 between a plus 24 volt line 252 and a ground line 254. Closing of the switch S1 also energizes the forward drive clutch 71. Energization of relay winding 1R closes holding contacts 1R-1. When the forward clutch 71 is energized in the manner described, carriage 36 and carriage 46 begin their movement from right to left in the forward direction as viewed in FIG. 1. When the carriage 36 moves out of its home position, a homong switch S2 closes. Under those conditions of operation wherein the carriage 36 is to make a full length scan, at the end of the scan it actuates a switch S3 to energize winding 2R. Energization of winding 2R opens normally closed switch contacts 2R-1 to interrupt the circuit of clutch 71, closes contacts 2R-2 to energize the reverse clutch winding 73 and completes its own holding circuit through switch 2R-3. Ultimately, when the carriage 36 returns to its home position, it opens switch S2 to interrupt the circuit of the reverse clutch 73 and to interrupt the holding circuit of winding 2R.

As will more fully be explained hereinbelow, when the first copy made has a length which is less than the length of the maximum length of scan, after the first copy has been made we shorten the scan. This is accomplished by moving a switch S5 to a position at which it connects a normally open switch S4 to the line 252. Switch S4 is positioned along the path of movement of the carriage 36 so as to be closed by the carriage when the carriage has travelled through a distance corresponding to the shorter length of paper. With S5 in a position at which it connects switch S4 to line 252, when S4 closes winding 2R is energized to cause the carriage to return to its home position after it has completed the forward stroke of the shorter scan.

Our control circuit includes a switch S6 adapted to be selectively positioned in engagement with one or the other of two contacts, which respectively correspond to the main and auxiliary cassettes. A lamp L1 connected between one of the contacts associated with switch S6 and ground is energized to indicate that one of the cassettes is in operation when switch S6 engages the contact associated with that lamp. A second lamp L2 is illuminated when the other cassette has been selected. Respective empty signal switches S7 and S8 are connected by respective diodes to a lamp L3 which is illuminated when the empty switch of the cassette in operation closes to provide an out-of-paper indication. In addition, closing of such a switch provides an out-of-paper signal on a line 256.

Switch S5 is under the control of a relay winding 5R. Normally, switch S5 occupies that position at which switch S4 is connected to the 24 volt line 52. However, when energized winding 5R moves the switch S5 out of engagement with the contact going to line 252. This is accomplished by a circuit including transistors Q5 and Q6. With a signal applied to the base of transistor Q5 both transistors conduct to complete a path for relay 5R from the plus 24 volts source to ground. It will further be appreciated that this is the condition which must exist for the first scan which is always the maximum scan and for scans following the initial measurement of a longer copy in a manner to be described. It will thus be apparent that for the initial scan and where copies of the greater length are being made, winding 5R should be energized to move switch S5 to a position at which switch S4 is out of the circuit. Where the first copy is a shorter copy, winding 5R is deenergized following the first scan and switch S4 is in the circuit.

We connect the cassette change motor 228 between line 252 and one contact of a normally open switch 6R-1, the other contact of which is connected to ground line 254. Switch 6R-1 is under the control of the winding 6R, one terminal of which is connected to line 252 and the other terminal of which is connected to a switch S12 movable between a first contact corresponding to the main cassette and a second contact corresponding to the auxiliary cassette. A first pair of transistors Q7 and Q8 are adapted to be energized to connect one of the contacts of switch S12 to ground, while another pair of transistors Q9 and Q10 are adapted to be energized to connect other contact of switch S12 to ground. If under a condition of operation, the engaged contact of switch S12 is connected to ground, winding 6R is energized to close contacts 6R-1 momentarily to energize motor 228. Under these conditions, a switch S13 will be closed to complete the circuit of motor 228 for half a revolution. Moreover, when the cassette has been changed, switch S12 will have moved to its other position. As will be more fully explained hereinbelow, we use the same signal to cause motor 228 to drive to the main cassette upon "power up" as that signal which energizes 5R.

We connect the back bar positioning motor 136 between line 252 and one terminal of a relay switch 4R-1, the other terminal of which goes to ground line 254. Switch 4R-1 is controlled by a winding 4R connected between line 254 and the contact arm of a switch S11 having respective upper and lower contacts corresponding to the two positions of back bar 126. With the bar in one position and switch S11 positioned accordingly in order to move the bar to the other position a first pair of transistors Q1 and Q2 are rendered conductive to ground the lower terminal of winding 4R to close switch 4R-1 to energize motor 136. A one revolution cam 314 associated with motor closes a switch S10 to cause the motor 136 to complete a revolution. In response to this movement switch S11 moves into engagement with the other contact. To return the back bar to its other position, a pair of transistors Q3 and Q4 are rendered conductive to ground the now engaged contact of switch S11.

Our circuit includes a 555 multivibrator circuit indicated generally by the reference character 258, which is adapted to produce a pulse on a line 260 in response to "power up" condition of the machine. This condition is indicated schematically by closing of the switch 259 connected to a plus 12 volt terminal of the circuit. The pulse on line 260 is applied to the set input terminal of a set-reset flip-flop indicated generally by the reference character 262 made up of a pair of NOR gates 266 and 264. This circuit provides the signal on line 284 for controlling transistors Q1 and Q2. The signal on line 260 is applied to a two input NAND gate 264, the output terminal of which is connected by a resistor 269 to the reset input terminal of set-reset flip-flop indicated generally by the reference character 270 made up of a pair of NAND gates 272 and 274. A diode 296 couples resistor 269 to the output terminal of a two input NOR gate 294, which is adapted to receive a "cassette change" and "out-of-paper" signal in a manner to be described.

The $\overline{Q}$ output of flip-flop 270 provides the S input for a set-reset flip-flop indicated generally by the reference character 276 made up of two input NOR gates 228 and 280. The Q output of flip-flop 276 on line 277 provides the control signal for relay 5R and for transistor Q10, while the $\overline{Q}$ output of the flip-flop 276 provides a signal on line 286 for controlling transistors Q3 and Q4 as well as the control signal for transistor Q7.

Out control circuit includes a second 555 multivibrator circuit indicated generally by the reference character 300. The trigger input terminal of multivibrator 300 receives its input from a two input NOR circuit 302 to which a copy length signal is applied by a switch S9. Switch S9 which is designated as 118 in FIGURE 1, remains closed as a copy emerges from the machine for a period of time corresponding to the length of the copy. In addition, this switch actuates a count relay winding 3R, which will not be described in further detail since this relay per se forms no part of our invention. We so select the parameters of the 555 circuit 300 as to cause it to produce an output signal of a time duration which is intermediate a time which corresponds to the time of a longer sheet and a time corresponding to the time of a shorter sheet. We apply the output of gate 302 not only to multivibrator 300 but also to the set input terminal of flip-flop 270 to one input terminal of a two input NAND circuit 308 and to a series RC circuit 310 and 312, the common terminal of which is connected to one input of a NOR gate 314. NAND gate 308 and NOR gate 314 receive as their second inputs the output signals from gate 300.

Gate 308 provides one input to a NOR gate 282, the other input of which is supplied by the output of NAND gate 274. We apply the output of gate 282 to an RC circuit, including resistor 283 and capacitor 285, the common terminal of which elements provide the reset signal for circuit 276. NOR gate 314 supplies the reset signal for flip-flop 262.

Without going into detail of the operation of the various components of our control circuit, the operation can best be understood by considering the condition at various points in the circuit at certain times of operation. It is to be remembered that we at all times wish the initial scan to be a 14 inch scan and that we initially wish to withdraw paper from the main cassette whether the paper contained therein be paper of a shorter size or paper of a longer size. The scan is set and the back bar is set only after the first copy of a series of copies has passed out of the machine.

Under the initial conditions of power up on the machine, the $\overline{Q}$ output of gate 270 will be high to result ultimately in a high condition of the Q output of flip-flop 276. Under these conditions, winding 5R is energized so that switch S4 is out of the circuit and a 14 inch scan will result. In addition, this signal causes motor 228, if necessary, to drive to a position at which the main cassette is active.

Following the initial conditions just described, which are the result of the power up pulse from multivibrator 258, as the first copy emerges from the machine switch S9 applies to the input of gate 302 a signal of a length corresponding to the length of the copy sheet emerizing from the machine. At the same time, multivibrator 300 produces an output pulse which is of a length intermediate the short paper and long paper signal inputs to circuit 302. If the first sheet sensed is a longer sheet, the Q output of flip-flop 276 remains high so that winding 5R is energized to keep switch S4 out of the circuit and at the same time the main cassette remains in use. Further under these conditions, the $\overline{Q}$ output of flip-flop 262 on line 284 is high. This results in moving the back bar 126 to its longer paper condition if it had been in its shorter paper position.

Conversely to the above, if the first sheet which passes out of the machine is a shorter sheet, the Q output of flip-flop 276 is low so that winding 5R is deenergized and switch S5 puts switch S4 in the circuit, thus the scan is reduced from that corresponding to the longer copy to that corresponding to the shorter copy. At the same time, the $\overline{Q}$ output from flip-flop 276 is high causing the bar 126 to move to its shorter copy position if it was not originally in that position.

If the user wishes to change from one cassette to the other, he operates a push-button 318 which will result in energizing motor 228 to rotate through half a revolution to move from the cassette which had been in use to the other cassette. Another and subsequent actuation of button 318 will return the user to the cassette originally in use. After a cassette change has been made, paper length is again sensed and the back bar position and scan stroke are changed as necessary. It is to be noted that, as has been pointed out hereinabove, gate 294 in addition to receiving a cassette change signal in response to the operation of switch 318 also is adapted to receive a signal when the empty switch S7 or S8 of the cassette which is in use closes to indicate an "out-of-paper" condition. This signal is provided in order to set the circuitry to look for the length of the next copy being made even though the cassette may have been reloaded. That is to say, if the cassette in use were out of paper and the user reloaded it with a different size paper, the out-of-paper signal enables the circuit to examine the size of the new paper.

It is to be noted that our system, in which the paper length signal results from an actual measurement of copy length eliminates the uncertainties inherent in a system employing a cassette selection signal to indicate paper length. That latter assumes that a given cassette has been loaded with paper of a certain size which may not in fact be the case.

Figure 6:
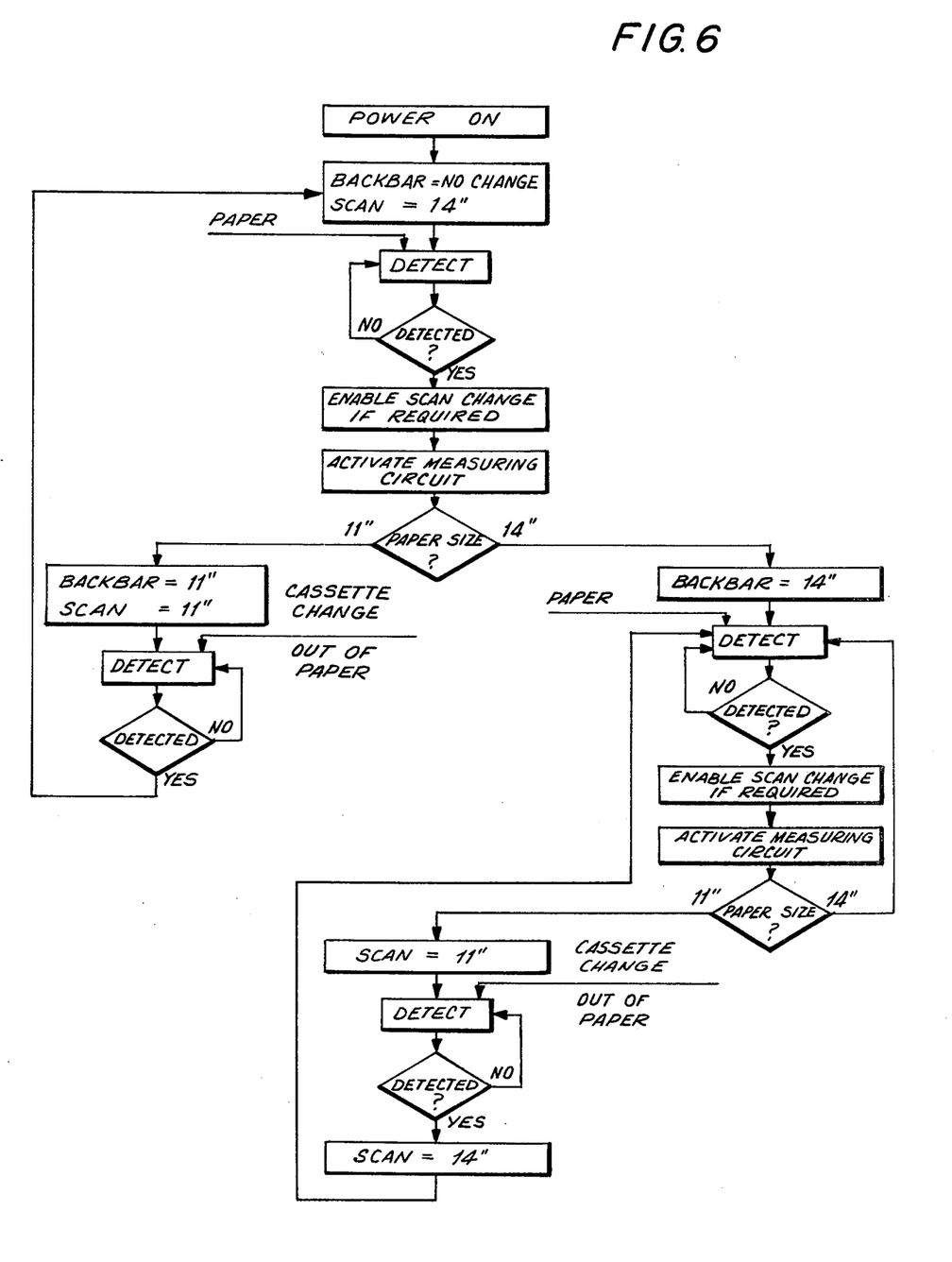
FIG. 6 is a flow diagram illustrating the operation of our copier scan and collator back bar control system.

It is believed that the operation of our circuit will be clear from the description hereinabove considered together with the flow diagram of FIG. 6. As is indicated therein when power is on there is no change in the back bar position and the initial scan is 14 inches. At the same same time, as has been explained hereinabove, the main cassette feed is activated. When this is done, the emergence of paper from the machine is detected and in response to that detection a scan change is made if required. After the size of the first copy has been detected the back bar is set at 14 inches if, for example, 14 inch paper has been detected. If 11 inch paper has been detected, the back bar is set at 11 inches and the scan stroke is reduced to 11 inches. If a cassette change or out-of-paper signal is generated the system is told to return to an initial 14 inch scan.

It will be seen that we have accomplished the object of our invention. We have provided a control system for a copying machine which automatically sets the machine to make copies from the main supply when power is applied. Our system automatically sets the length of scan in accordance with the first copy made by the machine. In addition, our system automatically sets the back bar collator used with the machine at a location corresponding to the length of the copies which are being made.

It will be understood that certain features and subcombinations are of utility and may be employed without reference to other features and subcombinations. This is contemplates by and is within the scope of our claims. It is further obvious that various changes made be made in details within the scope of our claims without departing from the spirit of our invention. It is, therefore, to be understood that our invention is not to be limited to the specific details shown and described.

Having thus described our invention, what we claim is:

1. Apparatus for making collated sets of copies of a set of originals including in combination, a copying machine adapted to make copies on sheets of copy material fed thereto, first means for feeding sheets of copy material from a main supply to said machine, second means for feeding sheets of copy material from an auxiliary supply to said copy machine, the sheets of said main supply being of a different size than the sheets of the auxiliary supply, means for positioning an original to be copied at an exposure station, original scanning means including a scanning element and means mounting said scanning element at said scanning station for movement with a scanning stroke at least as long as the longest sheet of copy material fed to the machine, a collator having a plurality of bins for receiving copies from said machine, said collator including a back bar and means for positioning said back bar to adjust the size of said bins, a control circuit for said copier and collator, means for setting said scanning means to vary the length of said scanning stroke, means responsive to the application of power to said circuit for enabling said main supply feeding means and for actuating said setting means to cause said scanning means to scan with a scanning stroke at least equal to the longest copy to be made, means for measuring the length of the first copy made following application of power to said circuit, means responsive to said measuring means for setting said scanning means to move with a scanning stroke substantially equal to the length of said first copy and for positioning said back bar in accordance with the length of said first copy, means for producing a paper change signal, means responsive to said paper change signal for shifting from said main supply feeding means to said auxiliary supply feeding means, means for producing a signal indicating that the supply in use is out of paper and means responsive to each of said paper change and out of paper signals for actuating said scan setting means to scan with a stroke at least equal to the length of the longest copy to be made.

2. Apparatus for making collated sets of copies of a set of originals including in combination, a copying machine adapted to make copies on sheets of copy material fed thereto, first means for feeding sheets of copy material from a main supply to said machine, second means for feeding sheets of copy material from an auxiliary supply to said copy machine, the sheets of said main supply being of a different size than the sheets of the auxiliary supply, means for positioning an original to be copied at an exposure station, original scanning means including a scanning element and means mounting said scanning element at said scanning station for movement with a scanning stroke at least as long as the longest sheet of copy material fed to the machine, a collator having a plurality of bins for receiving copies from said machine, said collator including a back bar and means for positioning said back bar to adjust the size of said bins, a control circuit for said copier and collator, means for setting said scanning means to vary the length of said scanning stroke, means responsive to the application of power to said circuit for enabling said main supply feeding means and for actuating said setting means to cause said scanning means to scan with a scanning stroke at least equal to he longest copy to be made, means for measuring the length of the first copy made following application of power to said circuit, means responsive to said measuring means for setting said scanning means to move with a scanning stroke substantially equal to the length of said first copy and for positioning said back bar in accordance with the length of said first copy, means for producing a paper change signal, means responsive to said paper change signal for shifting from said main supply feeding means to said auxiliary supply feeding means, and means responsive to said paper change signal for actuating said scan setting means to scan with a stroke at least equal to the length of the longest copy to be made.

3. Apparatus for making collated sets of copies of a set of originals including in combination, a copying machine adapted to make copies on sheets of copy material fed thereto, first means for feeding sheets of copy material from a main supply to said machine, second means for feeding sheets of copy material from an auxiliary supply to said copy machine, the sheets of said main supply being of a different size than the sheets of the auxiliary supply, means for positioning an original to be copied at an exposure station, original scanning means including a scanning element and means mounting said scanning element at said scanning station for movement with a scanning stroke at least as long as the longest sheet of copy material fed to the machine, a collator having a plurality of bins for receiving copies from said machine, said collator including a back bar and means for positioning said back bar to adjust the size of said bins, a control circuit for said copier and collator, means for setting said scanning means to vary the length of said scanning stroke, means responsive to the application of power to said circuit for enabling said main supply feeding means and for actuating said setting means to cause said scanning means to scan with a scanning stroke at least equal to the longest copy to be made, means for measuring the length of the first copy made following application of power to said circuit, means responsive to said measuring means for setting said scanning means to move with a scanning stroke substantially equal to the length of said first copy and for positioning said back bar in accordance with the length of said first copy, means for producing a signal indicating that the supply in use is out of paper and means responsive to said out of paper signal for actuating said scan setting means to scan with a stroke at least equal to the length of the longest copy to be made.

4. Apparatus for making collated sets of copies of a set of originals including in combination, a copying machine adapted to make copies on sheets of copy material fed thereto, first means for feeding sheets of copy material from a main supply to said machine, second means for feeding sheets of copy material from an auxiliary supply to said copy machine, the sheets of said main supply being of a different size than the sheets of the auxiliary supply, means for positioning an original to be copied at an exposure station, original scanning means including a scanning element and means mounting said scanning element at said scanning station for movement with a scanning stroke at least as long as the longest sheet of copy material fed to the machine, a collator having a plurality of bins for receiving copies from said machine, said collator including a back bar and means for positioning said back bar to adjust the size of said bins, a control circuit for said copier and collator, means for setting said scanning means to vary the length of said scanning stroke, means responsive to the application of power to said circuit for enabling said main supply feeding means and for actuating said setting means to cause said scanning means to scan with a scanning stroke at least equal to the longest copy to be made, means for measuring the length of the first copy made following application of power to said circuit and means responsive to said measuring means for setting said scanning means to move with a scanning stroke substantially equal to the length of said first copy and for positioning said back bar in accordance with the length of said first copy.

5. Apparatus for making collated sets of copies of a set of originals including in combination, a copying machine adapted to make copies on sheets of copy material fed thereto, first means for feeding sheets of copy material from a main supply to said machine, second means for feeding sheets of copy material from an auxiliary supply to said copy machine, the sheets of said main supply being of a different size than the sheets of the auxiliary supply, a collator having a plurality of bins for receiving copies from said machine, said collator including a back bar and means for positioning said back bar to adjust the size of said bins, means responsive to the passage of a sheet of copy material through the machine for measuring the length of a copy made by said copy machine, and means responsive to said measuring means for positioning said back bar in accordance with the length of said copy.

6. Apparatus for making copies of originals including in combination, a copying machine adapted to make copies on sheets of copy material fed thereto, first means for feeding sheets of copy material from a main supply to said machine, second means for feeding sheets of copy material from an auxiliary supply to said copy machine, the sheets of said main supply being of a different size than the sheets of the auxiliary supply, means for positioning an original to be copied at an exposure station, original scanning means including a scanning element and means mounting said scanning element at said scanning station for movement with a scanning stroke at least as long as the longest sheet of copy material fed to the machine, a control circuit for said copier, means for setting said scanning means to vary the length of said scanning stroke, means responsive to the application of power to said circuit for enabling said main supply feeding means and for actuating said setting means to cause said scanning means to scan with a scanning stroke at least equal to the longest copy to be made, means responsive to the passage of a sheet of copy material through the machine for measuring the length of the first copy made following application of power to said circuit and means responsive to said measuring means for setting said scanning means to move with a scanning stroke substantially equal to the length of said first copy.

7. Apparatus for making copies of originals including in combination, a copying machine adapted to make copies on sheets of copy material fed thereto, first means for feeding sheets of copy material from a main supply to said machine, second means for feeding sheets of copy material from an auxiliary supply to said copy machine, the sheets of said main supply being of a different size than the sheets of the auxiliary supply, means for positioning an original to be copied at an exposure station, original scanning means including a scanning element and means mounting said scanning element at said scanning station for movement with a scanning stroke at least as long as the longest sheet of copy material fed to the machine, means for setting said scanning means to vary the length of said scanning stroke, means responsive to the passage of a sheet of copy material through the machine for measuring the length of a copy made by said machine, and means responsive to said measuring means for setting said scanning means to move with a scanning stroke substantially equal to the length of said copy.

8. Apparatus for making copies of originals including in combination, a copying machine adapted to make copies on sheets of copy material fed thereto, first means for feeding sheets of copy material from a main supply to said machine, second means for feeding sheets of copy material from an auxiliary supply to said copy machine, the sheets of said main supply being of a different size than the sheets of the auxiliary supply, a control circuit for said copier, and means responsive to the application of power to said circuit after a preceding shutdown of said machine for enabling said main supply feeding means, said enabling means for disabling said second feeding means in the event that said second feeding means had been enabled on the last operation of said machine preceding said shutdown.

9. Apparatus for making copies of originals including in combination, a copying machine adapted to make copies on sheets of copy material fed thereto, first means for feeding sheets of copy material from a main supply to said machine, second means for feeding sheets of copy material from an auxiliary supply to said copy machine, the sheets of said main supply being of a different size than the sheets of the auxiliary supply, and means for ensuring that said first feeding means is enabled upon an initial operation of said machine following a preceding shutdown of the machine, said ensuring means including means for disabling said second feeding means in the event that said second feeding means had been enabled on the last operation of the machine prior to said shutdown.

10. Apparatus including in combination, a copier adapted to make copies of different lengths, a collator having bins for receiving copies from said copier, said collator including a back bar, means mounting said back bar for movement to adjust the size of said bins, means responsive to movement of a sheet of copy material through the machine for measuring the length of a copy made by said machine and means responsive to said measuring means for moving said back bar to adjust said bins to the size of said copy.

11. A copying machine including in combination, means for making copies of different sizes, means for receiving an original to be copied, a scanning element, means mounting said scanning element for movement relative to the original receiving means along a path with a scanning stroke at least equal to the length of the longest copy to be made, means responsive to movement of a sheet of copy material through the machine for measuring the length of a copy made by said machine and means responsive to said measuring means for regulating the length of said scanning stroke to the length of said copy.

* * * * *